2,832,085

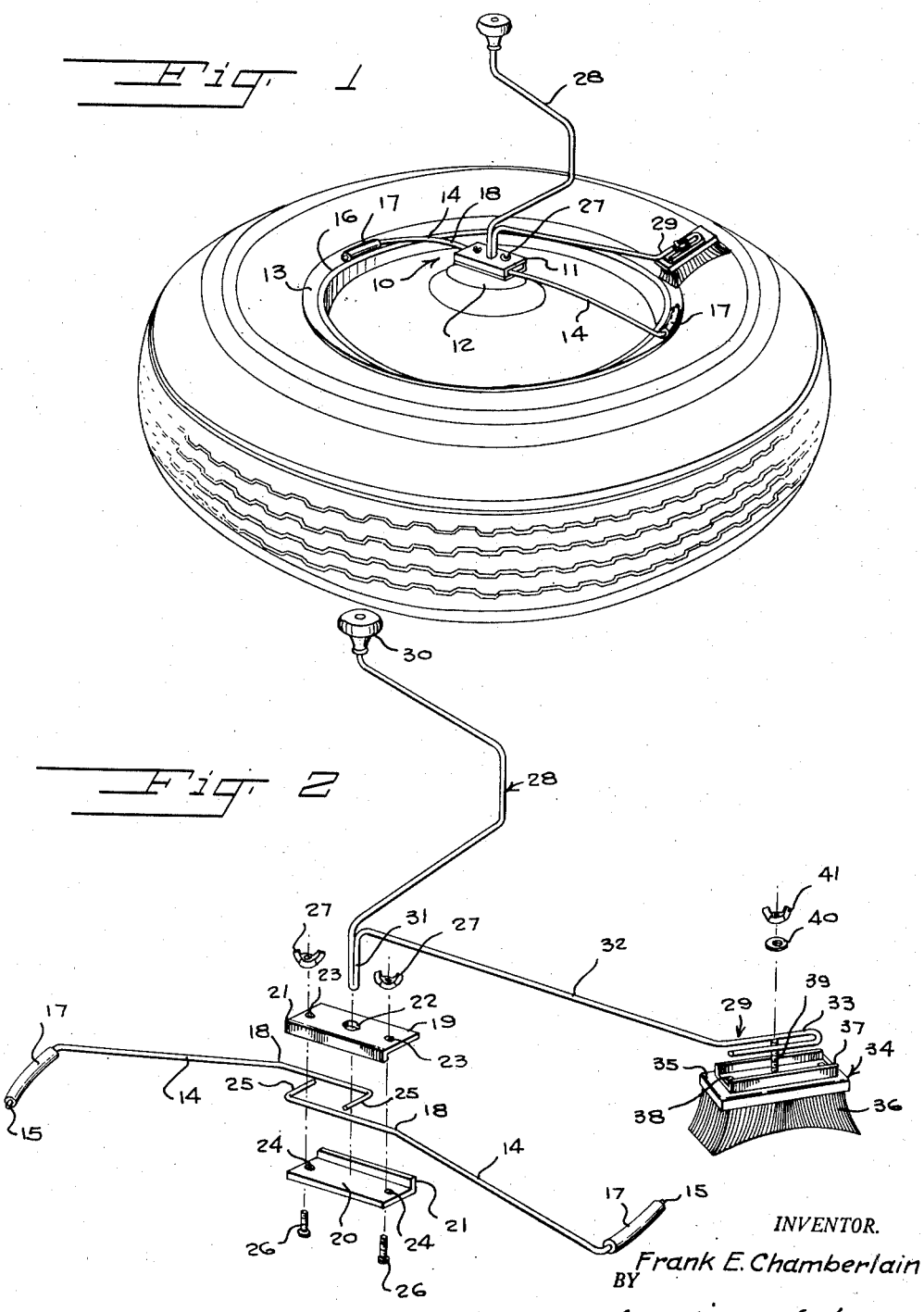

ROTARY BRUSH FOR CLEANING SIDE WALLS OF PNEUMATIC TIRES

Frank E. Chamberlain, Varna, Ill.

Application May 18, 1956, Serial No. 585,637

4 Claims. (Cl. 15—21)

This invention relates to a rotary brush especially constructed for washing white walls of tires and it consists in the constructions, arrangements and combinations herein described and claimed.

It is an important object of the invention to provide a rotary brush which may be applied to the tire while mounted upon the wheel of a motor vehicle, there being a manually rotatable brush in contacting engagement with the side wall of the tire for cleaning the same.

More specifically, it is an object of the invention to provide a base mounting adapted to seat centrally upon the wheel upon which a tire is mounted, the base mounting having a pair of oppositely extended radial arms, each having arcuate end portions extended in opposite circumferential directions adapted to seat in a circumferential groove formed in the tire rim, the base plate further having a central aperture for rotatably mounting a handle member, the handle including a radially extended sweep arm for mounting of a brush upon the end thereof in such position as to contact the side wall of the tire and clean the same upon rotation of the brush by said handle.

It is also an object of the invention to provide a rotary brush for cleaning side walls of tires wherein the mounting means for the brush is adjustable to different diameters of pneumatic tires, which is likewise true of the arms of the base mounting.

Additional objects, advantages and features of invention will be apparent from the following description, considered in conjunction with the accompanying drawing, wherein, Figure 1 is a perspective view of a pneumatic tire and rim having my rotary brush installed thereon.

Figure 2 is an exploded view, in perspective, illustrating the several elements constituting the rotary brush.

For an understanding of the construction embodied in my rotary brush, attention is invited to Figure 1 of the drawing, wherein the brush is generally indicated by the reference character 10 and comprises a base mounting 11. The base mounting 11 includes a pair of radially extended arms 14, the ends 15 of which are arcuate shaped and extend in opposite circumferential directions and are adapted to seat in the circumferential groove 16 formed in the rim 13. The ends 15 are each provided with a rubber sleeve 17 to protect the paint on the rim, as well as to form a frictional grip upon the rim, it being understood that the arms 14 being of spring steel and slightly bowed as at 18 a downward pressure will be exerted upon the sleeve members 17 and thus retain the base mounting centrally of the rim 13.

The base mounting 11 consists of a pair of rectangular metallic plates 19 and 20, one longitudinal edge of which is provided with a right angular flange 21. The plate 19 is provided with a medially located opening 22 for receiving the pivot of a handle presently to be described, and further is formed with bolt apertures 23. The plate 20 is also provided with bolt apertures 24 in registry with the apertures 23 when the plates are in assembled relation, and these apertures are preferably countersunk on the outer face of the plate so that the heads of retaining bolts will not interfere with proper seating upon the hub cap.

The arms are each formed with right angular portions 25. With the arms 14 positioned between the plates 19 and 20, with the angular portions 25 extending in opposite directions as shown in Figure 2, portions of the arms will rest against respective flanges 21, the plates being secured upon the arms by bolts 26 which pass through the apertures 24 and 23 and receive a wing nut 27.

Adjustment of the arms 14 so as to accommodate the different diameters of wheel rims may be accomplished by loosening the wing nuts 27 thereby permitting inward and outward movement of the arms to the proper distance and secured in such positions upon tightening the wing nuts.

The handle 28 and brush holder 29 are formed from a single strand of steel wire, one end being bent to form a brace or crank including a knob 30. At a point below the handle 28 the wire is reversely bent to form a pivot or bearing 31 which is freely received in the opening 22. The wire is then bent at right angles to form a sweep arm 32, the end of which is bent at an angle and reversely bent upon itself to form an elongated loop 33.

A brush 34 is employed in the cleaning of a tire wall, and in the present instance comprises a wooden body 35 in which there are secured bristles 36 which may be brass or fiber, and as shown the bristles are shaped so as to correspond to the side walls of a tire.

Upon the side of the body 35 opposite the bristles, a U-shaped metallic plate 37 is secured by means of countersunk screws 38 and medially of the plate 37 an upright threaded bolt 39 is secured.

The brush 34 is secured to the loop 33 of the sweep arm 32 by inserting the bolt 39 through the loop 33, placing a washer 40 upon the bolt and securing the washer in gripping engagement with the loop by means of a wing nut 41. The provision of the elongated loop 33 permits adjustment of the brush 34 so as to properly contact the side wall of a tire.

The operation of the device is substantially as follows:

The spring arms 14 having been adjusted to the proper circumference for cleaning a tire, the arms are slightly bowed to bring the ends 15 in line with the groove 16 of the rim and allowed to expand and seat therein. The base mounting 11 will then be supported centrally of the rim. The sleeve members 17 will assist in retaining the spring arms seated, as well as to protect the paint of the rim. With the brush 34 mounted on the sweep arm 32, the pivot or bearing 31 is positioned in the opening 22 of the plate 19, as shown in Figure 1. It is then only necessary to rotate the brush circumferentially of the tire by actuating the handle 28. The pivot or bearing 31 fits loosely in the opening 22 so that the handle and brush may be readily removed in order that water and a detergent may be applied to the brush, as the occasion may arise.

While I have shown and described a preferred form of the invention, this is by way of illustration only, and I consider as my own all such modifications in construction as fairly fall within the scope of the appended claims.

I claim:

1. A rotary brush for cleaning the side wall of a tire mounted on a wheel comprising a base mounting, said base mounting having means engageable in a circumferential groove in the rim of the wheel for support of the base mounting centrally of the rim, a sweep arm rotatably mounted in said base mounting, said sweep arm including a crank member for rotating said sweep arm circumferentially of the tire and a brush mounted upon the sweep arm for contacting engagement with a wall of the tire.

2. A rotary brush for cleaning the side wall of a tire mounted on a wheel comprising a base mounting, said base mounting having means engageable in a circumferential groove in the rim of the wheel for support of the base mounting, a sweep arm rotatably mounted in said base mounting, said sweep arm including a crank member for rotating said sweep arm circumferentially of the tire, a brush mounted upon the sweep arm for contacting engagement with a wall of the tire and said brush having bristles shaped corresponding to the side wall of the tire.

3. A rotary brush for cleaning the side wall of a tire mounted on a wheel comprising a base mounting, said base mounting having oppositely extending radially adjustable arms, each arm having an arcuate shaped terminal end, each end having a rubber sleeve thereon adapted to frictionally seat within a circumferential groove of the rim of the wheel, a detachable sweep arm rotatably mounted in said base mounting, said sweep arm having a crank member for rotating the sweep arm circumferentially of the tire, the outer terminal end of said sweep arm having an elongated loop; a brush member having a channel mounted on the back thereof and having an upright threaded stud for passage through the loop of the sweep arm, a washer disposed upon the loop of the sweep arm and a wing nut cooperable with the threaded stud for securing the brush to the sweep arm and the bristles of said brush having a contour corresponding to the shape of the side wall of a tire.

4. The structure of claim 3, in which said brush is adjustably mounted in said loop.

References Cited in the file of this patent
UNITED STATES PATENTS

| | | |
|---|---|---|
| 1,031,934 | Hunter | July 9, 1912 |
| 1,474,153 | Klein | Nov. 13, 1923 |